No. 854,879. PATENTED MAY 28, 1907.
V. E. EDWARDS.
MECHANISM FOR ADJUSTING BEARINGS.
APPLICATION FILED OCT. 8, 1906.

3 SHEETS—SHEET 3.

Witnesses
Roy D. Tolman.
Penelope Comberbach.

Inventor
Victor E. Edwards.
By Rufus B. Fowles
Attorney

UNITED STATES PATENT OFFICE.

VICTOR E. EDWARDS, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

MECHANISM FOR ADJUSTING BEARINGS.

No. 854,879.     Specification of Letters Patent.     Patented May 28, 1907.

Application filed October 8, 1906. Serial No. 337,908.

*To all whom it may concern:*

Be it known that I, VICTOR E. EDWARDS, a citizen of the United States, residing at Worcester, in the county of Worcester and Commonwealth of Massachusetts, have invented a new and useful Improvement in Mechanism for Adjusting Bearings, of which the following is a specification accompanied by drawings, forming a part of the same, in which—

Figure 1:
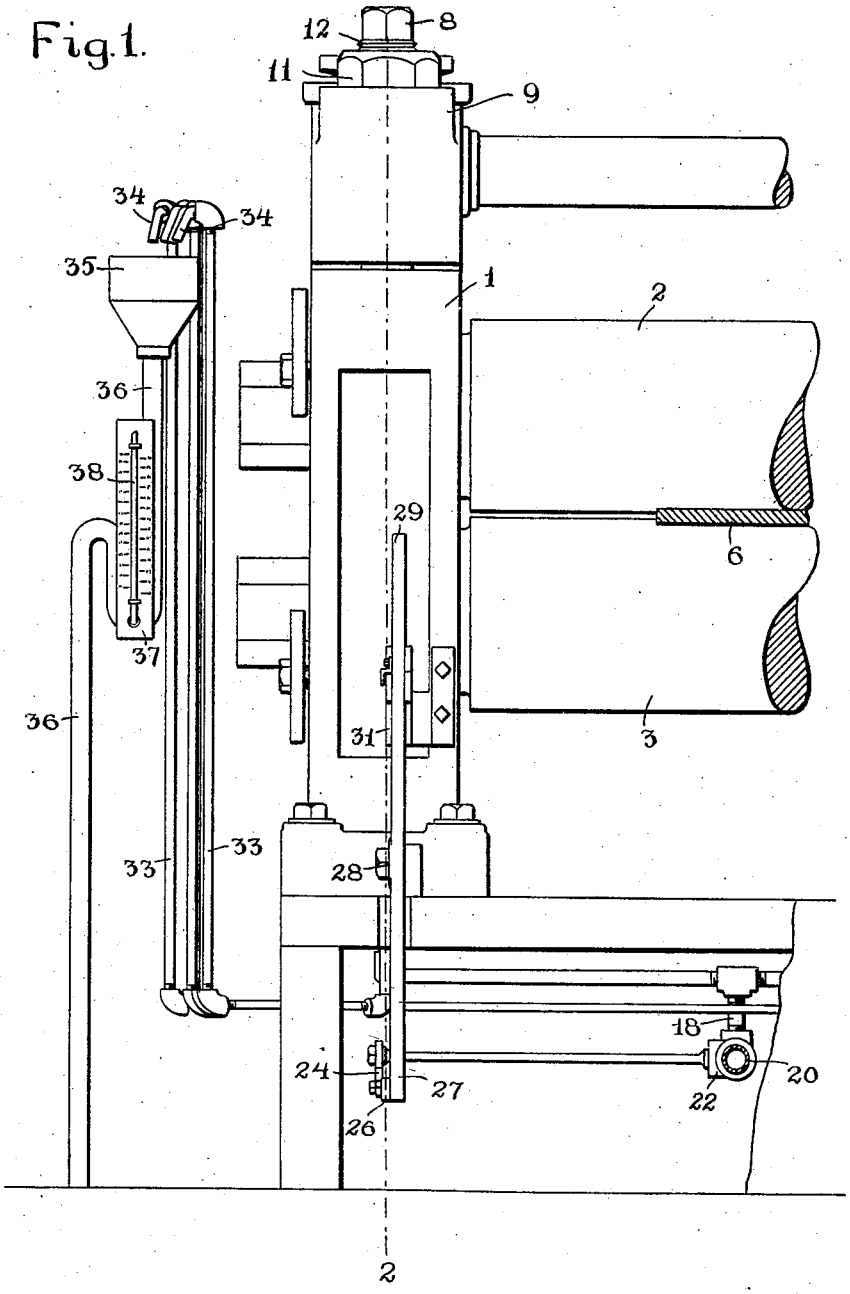
Figure 2:
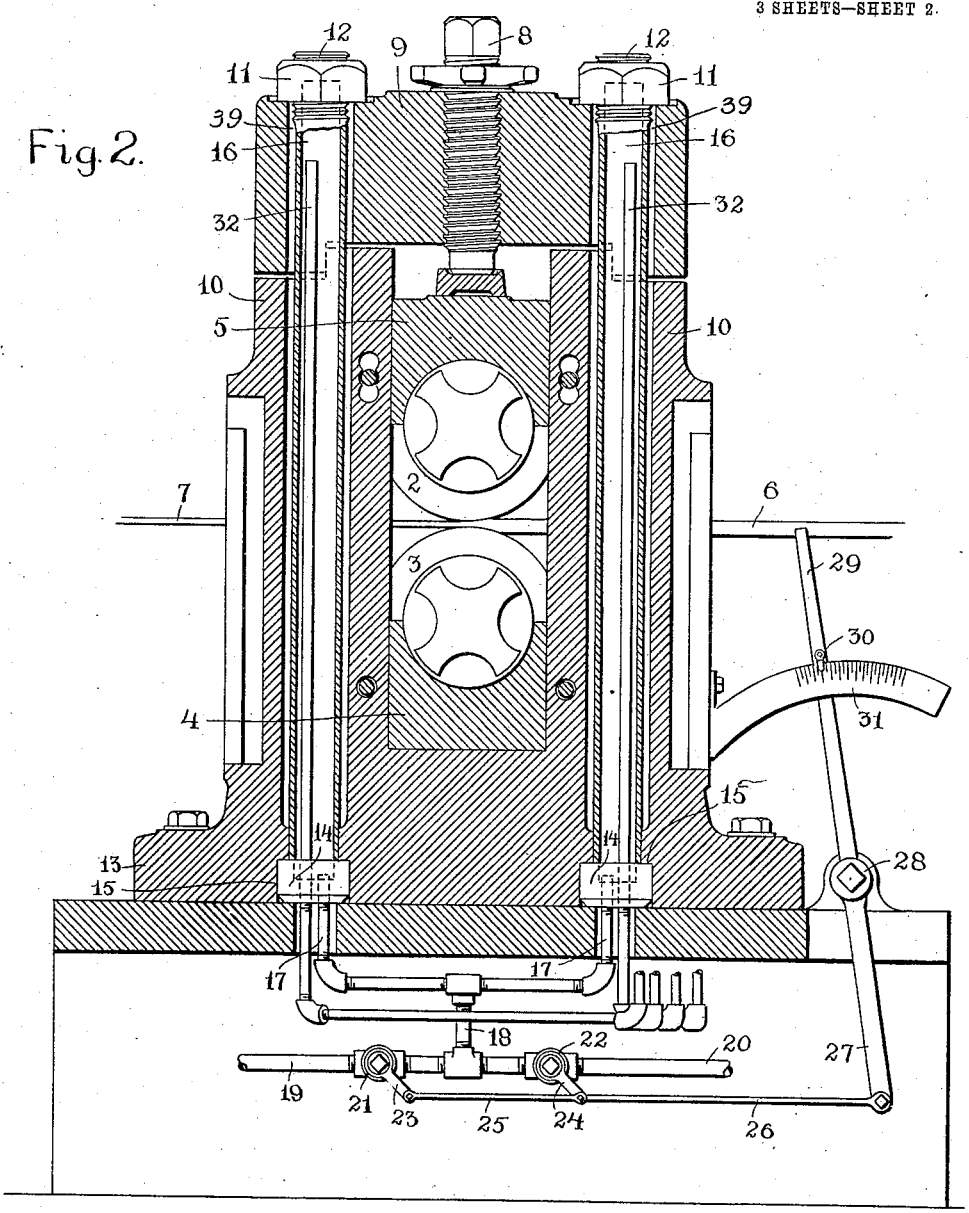
Figure 3:
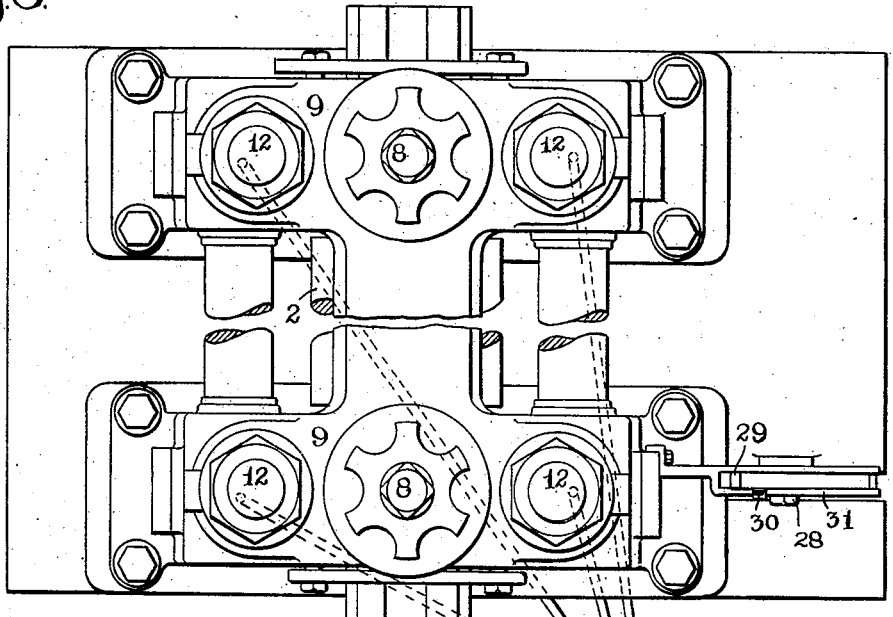
Figure 4:
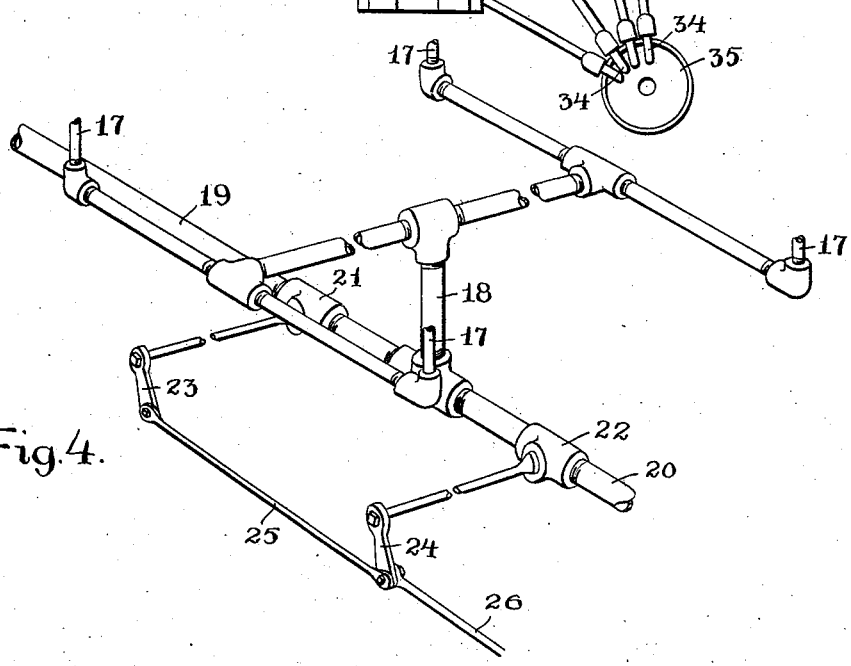

Figure 1 represents in front elevation the mechanism embodying my invention, as applied to the adjustment of the bearings of a pair of rolls, such as are employed in rolling mills for rolling metal. Fig. 2 is an end elevation of the same, with one of the roll housings shown in central sectional view on line 2—2, Fig. 1. Fig. 3 is a plan view. Fig. 4 is a detached perspective view showing a portion of the pipe connections to the hot and cold water supply.

Similar reference letters and figures refer to similar parts in the different views.

My present invention has for its object to provide means for the delicate and accurate adjustment of bearings in that class of machinery, such as calendering machines in paper mills, the rolls of metal rolling mills, and other machines where a fine adjustment of the operative parts is desired. In the accompanying drawings I have represented means for accomplishing this adjustment, and embodying my invention as applied to the adjustment of the roll bearings in housings of a metal rolling mill.

In that class of machines in which it is sometimes desirable to make a fine adjustment of the bearings of the operative parts, this adjustment has been accomplished by means of various mechanical devices, such, for example, as moving the bearings in the machine by means of wedges or screws.

My present invention consists broadly in approximately determining the desired position of the bearing and subsequently bringing the bearing to its position of accurate adjustment by the expansion or contraction of the retaining bolts or rods by which the bearing is held, which is accomplished by the application of heat to the retaining bolt or rod.

While I do not wish to confine myself to any specific means for accomplishing the expansion or contraction of the retaining bolts or rods of the bearing, this is conveniently accomplished in practice by making the bolts or rods hollow, and connecting their interior chambers with a source of water supply, with means for controlling the temperature of the water admitted.

Referring to the accompanying drawings 1 denotes the housing of a pair of rolls 2, 3, in a metal rolling mill. The lower roll 3 is supported upon a bearing 4, and the bearing of the upper roll 2 is received by an adjustable bearing 5 as the upper roll is lifted by the passage of a bar of metal 6 between the rolls. The position of the bearing 5 determines the distance which the upper roll is lifted and the resultant thickness of the rolled metal 7. As the bar of metal cools during the process of rolling, its resistance to a reduction in thickness increases, and the spring or yielding of the rolls is sufficient to unfavorably vary the thickness of the rolled metal where extreme accuracy is required. In order to maintain the thickness of the rolled metal it becomes necessary as the bar cools to gradually bring the bearing 5 downward sufficiently to compensate for the spring or yielding of the rolls.

In the construction of the housing as shown in the accompanying drawings, the upper bearing 5 bears against the end of an adjusting screw 8 which is held in a cap 9 normally supported upon the upright portion 10 of the housing. The cap 9 is capable of being lifted as a heated bar passes between the rolls, allowing the rolls to separate sufficiently to produce the desired thickness of the rolled metal, and the cap is held from further upward movement by means of nuts 11 held upon the screw threaded ends of bolts 12 which extend downward through the upright portions 10 of the housing into the base 13. The lower ends of the bolts are provided with collars 14 held in recesses 15 in the housing, and thereby holding the bolts from longitudinal movement. The bolts 12 are hollow throughout nearly their entire length inclosing the chambers 16. The lower ends of the chambers 16 are connected by pipes 17 with a common supply pipe 18, which communicates at its lower end with a pipe 19 leading to a cold water supply, and a pipe 20 leading to a hot water supply. The cold and hot water supply pipes 19 and 20 are provided with rotating stop cocks 21 and 22, provided with radial levers 23 and 24, which are connected by a link 25. The levers 23 and 24 are also operatively connected by a link 26 with a lever 27, pivoted at 28 and provided at its upper end with a handle 29. The lever 27 preferably carries a pointer 30 overlapping the edge of a curved graduated plate 31, by which the angular position of the lever is ascertained, and the relative open and closed position of the stop cocks 21 and 22 determined.

The upper ends of the chambers 16 communicate with overflow pipes 32 by which the water admitted to the bottom of the chambers 16 through the pipes 17 is conducted away from the chambers 16. The overflow pipes 32 pass downward through the closed ends of the bolts 12 and are brought together in a cluster of ascending pipes 33 which terminate at 34 over the top of a hopper 35, into which the water from the chambers 16 is delivered. From the hopper 35 the water passes through a waste pipe 36 having an S-shaped bend at 37. A thermometer 38 is applied to the waste pipe 36 with its bulb inserted within the pipe at the bottom of the S-shaped bend 37, in order to determine the temperature of the water escaping through the waste pipe.

The operation of my improved adjusting mechanism as applied to the roll bearings of a rolling mill is as follows:—The lever 27 is placed in position to close the cold water stop cock 21 and open the hot water stop cock 22, which allows a current of hot water to flow through the circulating system and bring the temperature of the bolts 12 to correspond with the temperature of the current of hot water passing through the chambers 16. The bearing 5 is adjusted by means of the screw 8 to allow the rolls to open sufficiently to bring the rolled metal to the desired thickness. As the rolling proceeds and the bar 6 gradually cools, its resistance to a reduction in thickness gradually increases, and as this occurs, which may be readily determined by the change in color of the heated bar, the lever 27 is rocked to slightly close the hot water stop cock 22 and correspondingly open the cold water stop cock 21, thereby lowering the temperature of the combined currents as they flow through the pipe 18 and are delivered to the bottom of the chambers 16. As the temperature of the water in the chambers 16 is reduced, the heat previously imparted to the bolts 12 is abstracted, thereby reducing the bolts 12 in length. The reduction in the length of the bolts 12 draws down the cap 9 and brings the upper roll 2 slightly nearer the lower roll 3, sufficient to compensate for the spring or yielding of the rolls due to the increased resistance of the rolled metal.

As the elongation or contraction of the bolts 12 is determined by the variation in the temperature of the water admitted to the chambers 16, it may be determined by means of the thermometer 38 which indicates the temperature of the water passing through the escape pipe 36, or it may be ascertained by the position of the pointer 30 upon the graduated plate 31, which indicates the angular position of the lever 27 that determines the relative opening or closing of the hot and cold water stop cocks 21 and 22.

The details of construction as illustrated in the accompanying drawings may be greatly varied without departing from the scope of my invention, which consists broadly in the thermal variation of the adjusting means for controlling the position of a bearing in any class of machines in which delicate adjustment is requisite.

The bolts 12 are surrounded by an annular space 39 which protects them from any external changes in temperature, but in cases in which it is inconvenient to inclose the bolts by a surrounding body of air, they may be protected by a covering of asbestos or other suitable material.

I claim,

1. The combination with a bearing and means for holding said bearing from movement in one direction, of means for producing a thermal variation in said holding means, thereby adjusting said bearing.

2. The combination with a bearing and means for holding said bearing from movement, of means for producing a thermal variation in said holding means, thereby adjusting said bearing.

3. The combination with a bearing, and holding means, having an interior chamber, for limiting the movement of said bearing, of means for supplying said interior chamber with a heating medium, whereby said holding means is expanded to provide for an adjustment of said bearing.

4. The combination with a bearing, and holding means, provided with an interior chamber, for limiting the movement of said bearing, of means for admitting a cooling medium to said chamber, whereby said holding means is contracted to provide for an adjustment of said bearing.

5. The combination with a bearing and means for applying pressure to said bearing, of means for producing a thermal variation therein, whereby the bearing is adjusted by the expansion or contraction of said pressing means.

6. The combination with a bearing and means for limiting the movement of said bearing, provided with an interior chamber, of means for maintaining a fluid circulation through said chamber, and means for varying the temperature of said fluid.

7. The combination with an adjustable bearing and means, provided with an interior chamber, for limiting the movement of said bearing, of means for maintaining a fluid circulation through said chamber, means for varying the temperature of said fluid and means for determining the temperature of said fluid.

8. A thermal adjusting apparatus for the adjustment of a bearing, comprising a circulating medium and means for varying the temperature of said circulating medium at will.

9. A thermal adjusting apparatus for the adjustment of a bearing, comprising a circulating medium, means for varying the temperature of said circulating medium at will, and means for ascertaining the temperature of said circulating medium.

10. The combination with a bearing and means for varying the position of said bearing, comprising a hollow bolt applied to hold the bearing from movement in one direction and having an interior chamber, a water pipe communicating with one end of said chamber, an overflow pipe communicating with the opposite end of said chamber and forming part of a circulating system, and means for varying the temperature of the water in said system.

11. The combination with a framework and a bearing held therein, of means for adjusting the position of said bearing in its framework, comprising a hollow bolt adapted to press against one side of said bearing, a water supply pipe for said bolt, means for connecting said water supply pipe with a source of hot water and a source of cold water, and means for controlling the relative supply of hot and cold water through said supply pipe.

12. The combination with an adjustable bearing and means, provided with an interior chamber, for limiting the movement of said bearing, of a water supply pipe for said chamber, a feed pipe connecting said supply pipe with a source of hot water, a feed pipe connecting said supply pipe with a source of cold water, and means for controlling the relative flow of hot and cold water, whereby the temperature of the water supplied to said interior chamber is varied.

13. In a bearing adjusting mechanism, of the character described, the combination with a bearing of means for exerting a pressure against said bearing to effect its adjustment, means for internally varying the temperature of said pressing means, and means for protecting said pressing means from external variations of temperature.

Dated this 29th day of September 1906.
    VICTOR E. EDWARDS.
Witnesses:
 PHILIP N. TAFT,
 FRANK M. LORD.